United States Patent
Klein et al.

(10) Patent No.: US 11,270,111 B2
(45) Date of Patent: Mar. 8, 2022

(54) AUTOMATED MANAGEMENT OF POTENTIALLY HAZARDOUS OBJECTS NEAR POWER LINES

(71) Applicant: International Business Machines Corporation, Armonk, NY (US)

(72) Inventors: Levente I. Klein, Tuckahoe, NY (US); John Wamburu, Amherst, MA (US); Hendrik F. Hamann, Yorktown Heights, NY (US); Bryan Sacks, Markham (CA); Mahesh Sudhakaran, Larchmont, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 138 days.

(21) Appl. No.: 16/266,951

(22) Filed: Feb. 4, 2019

(65) Prior Publication Data
US 2020/0250424 A1   Aug. 6, 2020

(51) Int. Cl.
*G06K 9/00* (2022.01)
*G06Q 40/08* (2012.01)
(Continued)

(52) U.S. Cl.
CPC ......... *G06K 9/00657* (2013.01); *G06Q 40/08* (2013.01); *G06T 7/12* (2017.01); *G06T 7/13* (2017.01); *G06T 2207/30188* (2013.01)

(58) Field of Classification Search
None
See application file for complete search history.

(56) References Cited

U.S. PATENT DOCUMENTS

| 7,046,841 B1 * | 5/2006 | Dow | G01C 11/00 345/419 |
| 8,680,994 B2 * | 3/2014 | Leppanen | G06K 9/00657 340/540 |

(Continued)

FOREIGN PATENT DOCUMENTS

WO   2014147041 A1   9/2014

OTHER PUBLICATIONS

Kobayashi et al. "The Utilization of Satellite Images to Identify Trees Endangering Transmission Lines", IEEE Transactions on Power Delivery, vol. 24, No. 3, Jul. 2009 (Year: 2009).*

(Continued)

*Primary Examiner* — Randolph I Chu
(74) *Attorney, Agent, or Firm* — Cantor Colburn LLP; Joseph Petrokaitis (57) ABSTRACT

Embodiments of the present invention are directed to a computer-implemented method for detecting vegetation near a power line. A non-limiting example of the computer-implemented method includes detecting the spectral characteristics of a target location. The spectral characteristics can be used to detect a tree at the target location. The location of the power lines that are within a buffer distance of the tree can be detected. Given that the tree is within a buffer distance, a risk value can be calculated for the tree. The risk value can convey the likelihood that the tree will contact the power line. If the risk is above a threshold amount, a work order can be issued to direct a crew to trim or cut the tree to prevent it from contacting the power line.

17 Claims, 3 Drawing Sheets

(51) Int. Cl.
*G06T 7/12* (2017.01)
*G06T 7/13* (2017.01)

(56) References Cited

U.S. PATENT DOCUMENTS

| | | | |
|---|---|---|---|
| 9,477,899 B2 | 10/2016 | Li et al. | |
| 9,704,042 B2 | 7/2017 | Wu et al. | |
| 9,784,836 B2* | 10/2017 | Heinonen | G01S 17/89 |
| 10,032,267 B2* | 7/2018 | Strebel | G01S 17/86 |
| 10,614,307 B2* | 4/2020 | Stanley | G06K 9/00657 |
| 2012/0169498 A1* | 7/2012 | Leppanen | G06K 9/00657 340/540 |
| 2015/0063879 A1* | 3/2015 | Yuasa | G03G 21/0094 399/302 |
| 2016/0048925 A1 | 2/2016 | Emison et al. | |
| 2017/0100615 A1* | 4/2017 | Doten | G01S 7/4802 |
| 2017/0308860 A1* | 10/2017 | Samuel | G06Q 10/105 |
| 2018/0098137 A1 | 4/2018 | Saha et al. | |
| 2020/0159397 A1* | 5/2020 | Tohidi | G06F 3/04845 |

OTHER PUBLICATIONS

MacPhee et al. ("Comparison of approaches for estimating individual tree height-diameter relationships in the Acadian forest region Forestry", 2018; 91, 132-146, doi:10.1093/forestry/cpx039 Advance Access publication Sep. 23, 2017). (Year: 2017).*

Oberle et al. (When a tree falls: Controls on wood decay predict standing dead tree fall and new risks in changing forests, PLOS One | https://doi.org/10.1371/journal.pone.0196712 May 9, 2018) (Year: 2018).*

Earth Observing System, "Shortwave Infrared", https://eos.com/make-an-analysis/shortwave-infrared/, Dec. 2017 (Year: 2017).*

Qayyum et al., "Power lines vegetation encroachment monitoring based on satellite stereo images using stereo matching," IEEE Int. Conf. on Smart Instrumentation, Measurement and Applications (ICSIMA),INSPEC, 2014, pp. 5.

* cited by examiner

AUTOMATED MANAGEMENT OF POTENTIALLY HAZARDOUS OBJECTS NEAR POWER LINES

BACKGROUND

The present invention generally relates to computer-based detection systems, and more specifically, to computer-implemented methods, computer systems, and computer program products configured to automatically detect the presence of potentially hazardous objects or structures nears utility power lines.

Electrical power is delivered to end users through a three part system that includes "high power lines" running from generating stations to substations; "distribution lines" that transmit power from substations through neighborhoods and job sites; and "service drops" that transmit power from distribution line poles to the utility customer. Because high power lines and distribution lines (referred to collectively herein as "power lines") are wrapped for weather protection but not insulation, if a conductive object contacts a power line, electricity will attempt to travel from the power line through the object seeking ground or another power source with a different electrical potential. Because electricity can arc over to a nearby conductive object, the object does not need to have sustained contact with a power line in order to draw current therefrom. Trees and other vegetation near power lines, particularly trees that have fallen as a result of inclement weather, are examples of objects that can interfere with power lines and potentially cause power outages and other hazards.

SUMMARY

Embodiments of the present invention are directed to a computer-implemented method for detecting vegetation near a power line. A non-limiting example of the computer-implemented method includes detecting the spectral characteristics of a target location. The spectral characteristics can be used to detect a potentially hazardous object at the target location. The location of the power lines that are within a buffer distance of the potentially hazardous object can be detected. Given that the potentially hazardous object is within a buffer distance, a risk value can be calculated for the potentially hazardous object. The risk value can convey the likelihood that the potentially hazardous object will contact the power line. If the risk is above a threshold amount, a work order can be issued to direct to remove any potentially hazardous object away from the buffer distance of the power line.

Embodiments of the present invention are directed to a system for detecting vegetation near a power line. The computer system includes a memory and a hardware processor system communicatively coupled to the memory. The processor system is configured to perform the computer-implemented method.

Embodiments of the present invention are further directed to a computer program product for detecting vegetation near a power line. The computer product comprises a computer readable storage medium embodied with program instructions. The instructions are executable by a hardware processor; and cause the hardware processor to perform the computer-implemented method.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, grid-wide electrical power outages can be caused by objected contacting power lines. For example, trees contacting power lines can cause an electrical short and carry electricity from the line to the ground and potentially harm the public. Trees that have been weakened through disease or damage are also potential hazards as strong winds can cause the trees to fall over and either become entangled with the lines or rip through the lines. These are major public safety issues as there may be little to no warning that one is approaching a downed line or an object in contact with a downed line.

Another issue is that trees growing too close to power lines can create hazards even without physical contact. Given the correct conditions, an electrical discharge (or arc) can temporarily form a current between the power line and the vegetation. This phenomenon is known as electrical arcing. Electrical arcing between a power line and vegetation can occur even through the air, which is generally considered non-conductive. Electrical currents that are misdirected towards vegetation can result in fires and electrocution.

In addition to safety and reliability concerns, municipalities and utility companies must be aware of state and federal regulations that mandate minimum distances between power lines and vegetation.

For safety and reliability reasons so-called vegetation management techniques have been developed to control vegetation growth on and near power lines through mechanical and chemical methods. Within the field of vegetation management, line-clearance trimming refers to cutting, pruning, clearing, or removing vegetation that is close to or near power lines. This can include trees or branches that have grown in a direction approaching the lines. In addition, this can include trees that are hazardous to power lines due to either sickness or lightning strike and run the risk of falling over onto a power line. Current vegetation methods generally include humans visually inspecting power lines and dispatching work crews to trim or remove the vegetation. Verifying if the work was performed properly or at all requires at least a second human visual inspection. Unfortunately, human visual inspection can be time costly, consuming, required additional manpower, and inaccurate.

Turning now to an overview of the aspects of the invention, one or more embodiments of the invention address the above-described shortcomings of the prior art by providing an aerial image-based computer-controlled automated system that identifies target potentially hazardous objects near power lines. The automated system can be configured to, in response to the identification of a potentially hazardous object on or near a power line, create a work order and dispatch works crews to remove the potentially hazardous object from on or near the power line. Upon completion of the work, the automated system can also perform an aerial image-based inspection of the area to verify that the work crew created enough distance between the power line and the potentially hazardous object.

In embodiments of the invention, the potentially hazardous object is a tree or other growing vegetation. In embodiments of the invention, the location of local power lines can be identified by accessing governmental databases, power company databases or private third-party databases. Power poles can also be observed in high-resolution imagery or extracted from Light Detection and Ranging (LIDAR) imagery that creates a three dimensional cloud of all features above the earth surface. Power lines have well-defined features like connecting power lines and they tend to follow streets or lines of houses. Once identified, the location of power lines can be identified by the system as line segments overlaid on a local map. The line segments can be characterized as power lines by various methods including color, textual identification, or for example bold lines, dotted lines, dashed lines, etc. In very high-resolution images, the line locations can be identified and the images can be used to verify the power line locations or detect if any power lines have been relocated, removed, or added.

In embodiments of the invention, the system is configured to analyze a time series of satellite images to establish vegetation on the ground where trees are growing and track changes in the vegetation development in the past and project vegetation grow for future. A time series of satellite images are analyzed to establish vegetation on the ground (where are trees growing) and track changes in the vegetation development in the past and project vegetation grow for future. The vegetation in close proximity (e.g., within a minimum safe distance or mandated regulatory distance of power lines (i.e., transmission and distribution lines) are analyzed to identify individual trees based on spectral indices that track vegetation index (e.g., Normalized Difference Vegetation Index) and texture analysis of the trees. Tree delineation from the images creates polygons around tree crown perimeters that identify the extent of tree branches. Inside the polygons, one or more trees may be present. The power lines can be modeled as a line segment with variable widths extending on both sides of a single or multiple lines located along a road or transmission corridor. Intersections between power lines (line segments that have a certain width) and vegetation (closed polygons) can pinpoint all trees that are intersecting or are located within a buffer zone around the power line. Accordingly, systems and methods according to embodiments of the invention identify trees within a predetermined buffer zone of a power line and calculate a risk score based on tree proximity to the power line and vegetation encroaching the power lines.

Embodiments of the invention utilize spectral signatures to detect potentially hazardous objects such as trees or other vegetation. As sunlight strikes different objects, the objects will absorb certain wavelengths and reflect other wavelengths. Vegetation cell structure has evolved to reflect near-infrared (NIR) wavelengths light, whereas the chlorophyll or the plant's pigment absorbs the visible wavelengths of light. A remote imaging sensor, for example a moderate-resolution imaging spectroradiometer (MODIS), can be used to capture spectral data in 36 spectral bands.

The spectral signatures can be processed by software to determine a ratio of NIR light to visible light with a focus on red light waves. To determine the ratio of NIR light to red light, a system can generate a quotient of the difference of NIR light and red light over the sum of NIR light and red light. In general, the greater the concentration of NIR light to visible light, the denser the vegetation. In contrast, the greater the concentration of visible light to NIR light, the sparser the vegetation. The remote imaging sensor can be located on board a satellite, an unmanned aerial vehicle (UAV), an aircraft, or on an elevated location.

In addition to detecting vegetation growth, spectral bands can be used in accordance with aspects of the invention to identify various other vegetative characteristics. For example, the blue band can be used to distinguish soil from vegetation. The green band can be used to assess plant vitality. The red band can be used to determine a vegetative slope. The NIR-1 band can be used to determine biomass concentration. The NIR-2 band can be used to perform a more in-depth biomass analysis. The short-wave infrared (SWIR) band can be used to determine soil moisture content. 36 spectral bands can be detected using the remote imaging sensor. These spectral bands singularly and in combination can be used to detect various other vegetative characteristics including plant species.

Figure 1:
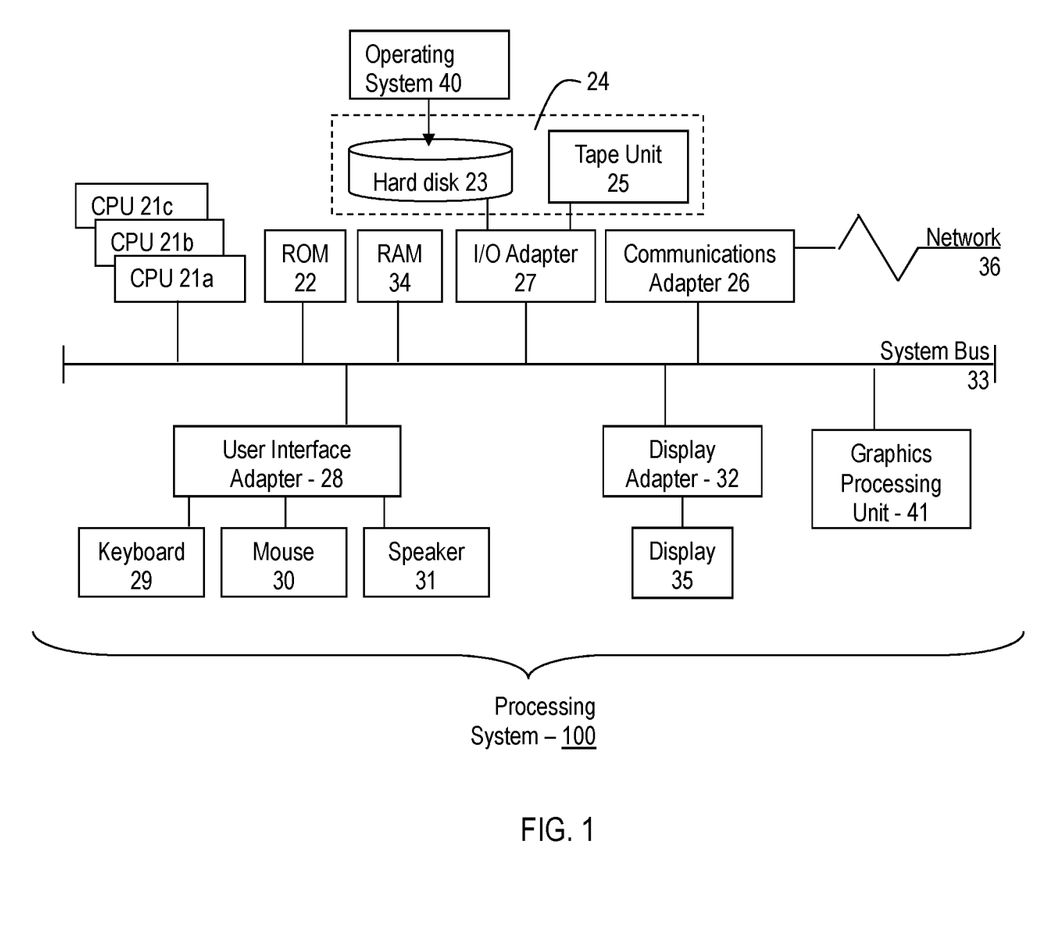
FIG. 1 depicts a block diagram of a computer system for use in implementing one or more embodiments of the present invention

Turning now to a more detailed description of embodiments of the invention, FIG. 1, depicts an embodiment of a processing system 100 for implementing the teachings herein. In this embodiment, the system 100 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 100.

FIG. 1 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 100 may be stored in mass storage 24. A network adapter 26 interconnects bus 33 with an outside network 36 enabling data processing system 100 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 100 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 1.

Figure 2:
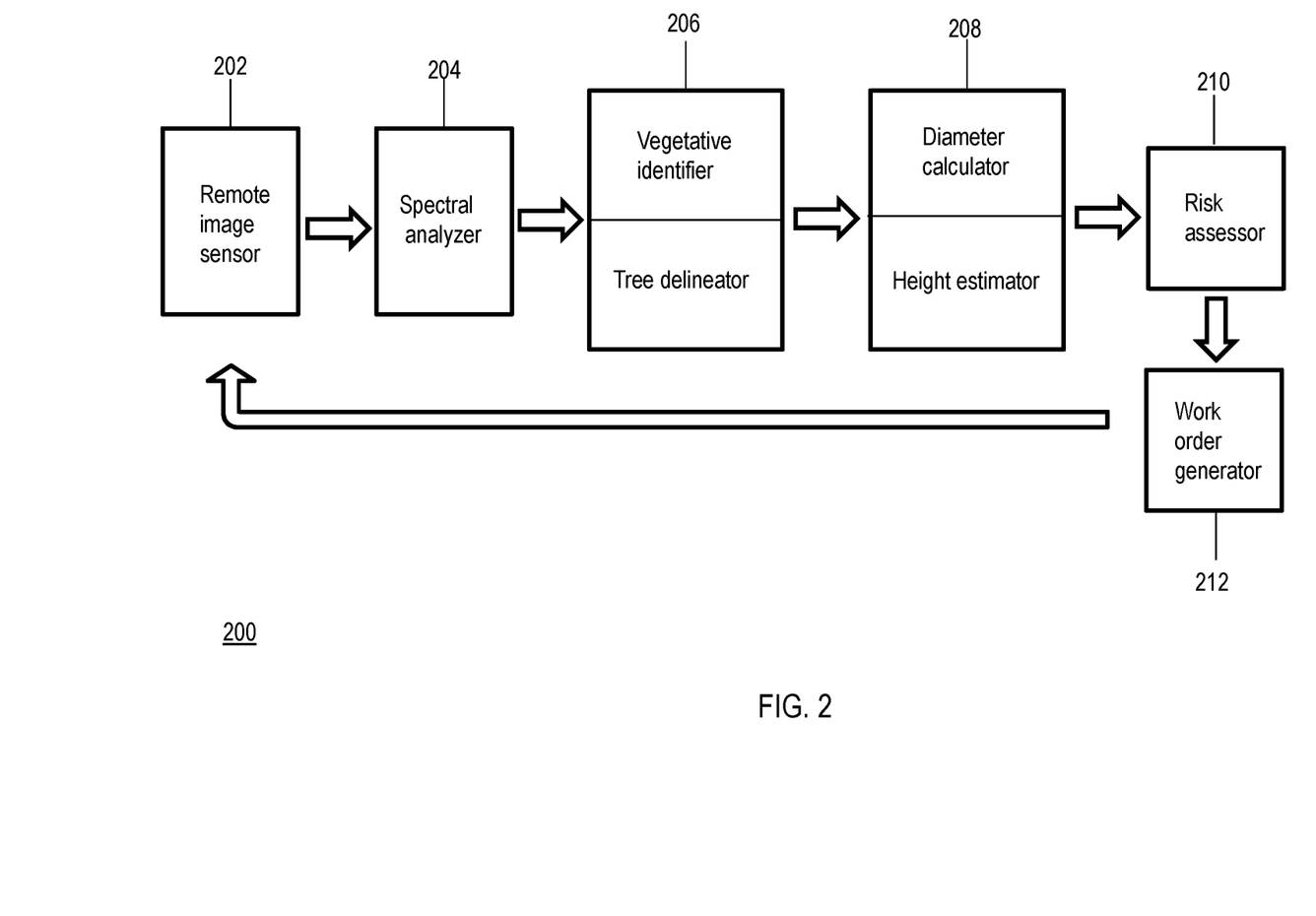
FIG. 2 depicts a system for detecting vegetation near a power line according to one or more embodiments of the present invention.

Referring to FIG. 2, a system 200 for detecting vegetation near power lines is shown. At block 200 the system includes a remote image sensor 202 for capturing spectral signatures. As described above, the remote image sensor 202 can be included in a satellite, an airplane, a UAV, or be positioned above a target location. In some embodiments, the system 200 includes multiple remote image sensors and can fuse the images with different spatial resolutions and time stamps into a single image. In other embodiments, the system 200 does not include a remote image sensor and is configured to receive images from external remote image sensor(s). The captured images can be single images at a single point in time or the images can be a series of images over a period of time. In additional to spectral data, the images can contain metadata that includes a time stamp and a geolocation of the target location. The geolocation data can include longitude and latitude data, global positioning satellite (GPS) data, or other geolocation data.

The system 200 processes images with a spectral analyzer 204. The spectral analyzer 204 analyzes characteristics of the reflected light. The spectral analyzer 204 can detect the spectral band characteristics at different points of an image. In some embodiments, the spectral analyzer 204 can extract the normalized difference vegetative index (NVDI) from an image. In other embodiments, the NDVI for a target location can be provided by an external source. The system 200 can include or access a library of spectral band characteristics to compare and determine various vegetative characteristics including but not limited to species, vitality, and concentration.

The system 200 can also be used to differentiate between a grass covered region and a tree covered region. To distinguish between these regions, certain high resolution photography could be used to capture high resolution images, in which the distinction between grass and trees is clear. However, in the absence of high-resolution imaging, the system 200 can analyze a difference in the texture of adjacent pixels to distinguish between trees and vegetation that is not trees. The system 200 can analyze the texture of a pixel and comparing its value, for example its NDVI value, to the values of the surrounding pixels. An area covered by grass can be considered to have approximately uniform pixel values throughout a target region. On the other hand, tree covered areas will exhibit non-uniform pixel values. This could be due a non-uniformity in a tree canopy, gaps between trees, height differences between trees, and other factors that affect the pixel values. In some embodiments, a pixel value variation between 20% and 30% can be indicative of the presence of trees. Power lines, in many instances, are run over grassy areas and the system can use these texture values to distinguish the trees from a grassy area. Pixels with high texture values can be considered tree-covered regions and pixels with low pixel values can be considered to be grass covered regions.

A vegetative identifier/tree delineator 206 can process the image or images using edge detection techniques to segment the vegetative mass into different trees. Other segmentation methods like clustering or region growth methods can be utilized to aggregate pixels with similar characteristics into a region. Each region is representative of an area that is identified as the tree canopy. The edge detection algorithms can segment the images based upon discontinuity and similarity of pixels values in the images. In addition to pixel values, the vegetative identifier/tree delineator 206 can take into consideration the differences in spectral characteristics to determine the edge of each tree crown. In some embodiments the power lines are overlaid on the image and only the vegetation that either overlaps a power line or is within a buffer distance of a power line is passed through an edge detection filter.

The vegetative identifier/tree delineator 206 can also identify each species of trees. As described earlier, each tree species has known spectral characteristics. The system 200 can include or have access to a library of vegetative species characteristics. The system 200 can compare the captured spectral characteristics with known spectral characteristics and identify each species of tree at the target location. Once the individual tree species have been identified, the height can be determined 208. A tree's diameter can be calculated by measuring the end to end diameter of the tree crown from the two dimensional image. To determine the tree height, the system 200 must extrapolate a three dimensional height from a two dimensional image. The height of a tree can be relative to a tree species and a tree crown diameter. During edge detection and segmentation process, the system 200 can overlay polygonal contours around the individual trees. The system 200 can then calculate an end to end diameter of these polygons to determine respective tree crown diameters. The estimated tree height from a tree crown diameter can be calibrated against a LIDAR extracted tree height (considered the true height) and a regression equation can be established that relates true tree height to extracted tree height.

Additional parameters provide more accurate predictions towards a tree height. These parameters include but are not limited to local weather and climate patterns, soil composition, elevation, geographical area, and surrounding vegetation. In addition, the system 200 can access textual and image data from additional resources such as social media, crowdsource gathered data, weather reports, scientific journals, and technical reports to improve tree height prediction. The system 200 can contain or have access to a library of tree heights in relation to species and crown diameter. The additional parameters can be associated with respective weight values to adjust the predicted tree heights.

The predicted tree heights can be transmitted to a risk assessor 210. The risk assessor 210 can output a risk value as to the likelihood that a tree will contact a power line. For example, one such risk factor is tree height and position in relation to the power line. If the tree height is higher than the distance to the power line, a strong wind can cause the tree can fall into the power line. A risk assessor 210 can predict a risk value on a matrix composed in part of parameters including tree height, weather patterns, climate patterns, tree health, and proximity to the power line. In other embodiments, the risk value is based in part on the parameters including tree height, weather patterns, climate patterns, tree health, and proximity to the power line and determined by various statistical methods. The risk assessor 210 also has access to heights of power lines, either by having access to the actual heights or having stored values of general heights of power lines. The risk assessor can also have access to soil characteristics and recent weather patterns. The ability of a tree to withstand a strong wind decreases in wet and sandy soil. As a result, the risk value can be either a static risk number or it can change dynamically in response to weather or climate changes.

The risk assessor 210 is also equipped with predictive functionality. For example, the risk assessor can use the tree species, height, environment to predict tree growth. The risk assessor 210 can then use the estimated tree growth to forecast a risk value of each tree for given time intervals. For example, the risk assessor 210 can give a six month, a one year, and a two year forecasted risk value. In some embodiments, a user can request a risk value for a custom time range or point. For example, for budgeting purposes, a municipality may want to predict the number of workers required to maintain vegetation over a fiscal year. The municipality could use the forecasted risk values to determine the number of workers needed.

The risk score can be normalized to fit within a specified range. The normalized risk score can be further broken down into risk classes based upon a threat level of damage and the potential impact to the environment and customers. For example, if the system 200 detects dry or arid conditions, the risk score can be classified as an extreme threat to cause harm to the environment through fire. In another example, if the power line is transmitting power to a grid powering a hospital or other emergency service provider, the risk class can reflect an elevated probability of injury to life. The risk assessor 210 can also order the trees based on risk values to create a prioritized list of trees that need to be maintained. In addition to individual trees, the risk assessor 210 can groups trees together and provide an overall risk value for each group. These group risk values can also be prioritized to provide a user a list of locations that need to be addressed quicker to reduce any hazards.

The system 200 can also be coupled with machine learning functionality to learn from acquired data. Artificial neural networks (ANNs) can be used to estimate height, predict tree fitness, and determine risk values. Other types of artificial intelligence models can be used including but not limited to decision trees, decision tables, support vector machines, clustering models, hidden Markov models, and Gaussian mixture models.

If the risk score is above a threshold amount, the system 200 can transmit a request to a work order generator 212 to initiate maintenance on the hazardous tree. The work order generator 212 can issue a work order for a specific tree or group of trees at a target location. The work order generator 212 can also store an expected finish date for the order. To verify that work has been completed, the system 200 can request new images of the target location and reinitiate the process. Once a new risk value is determined for the target location, the system 200 can determine if the risk value has decreased below a threshold amount or if a second work order needs to be issued for the target location.

Figure 3:
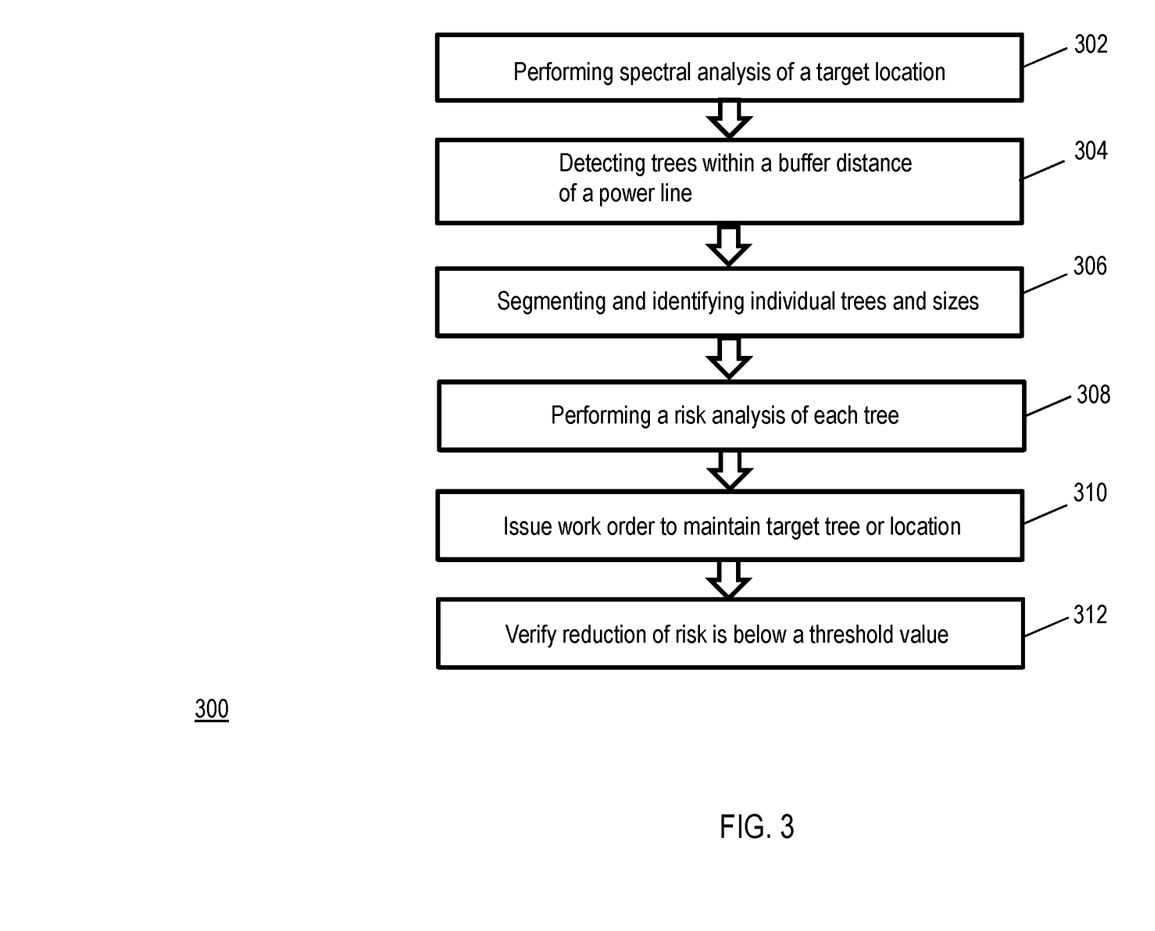
FIG. 3 depicts a flow diagram of a method for detecting vegetation near a power line according to one or more embodiments of the invention.

FIG. 3 depicts a flow diagram of a method for detecting vegetation around a power line according to one or more embodiments of the invention. The method 300 includes performing a spectral analysis of a target location 302. As described above, the spectral characteristics can be captured by a remote imaging sensor connected to the system. In other embodiments, the spectral characteristics of a target location are provided by an external source.

At block 304, the vegetation that is either overlapping or within a buffer distance of a power line can be detected. The system can either overlay the location of the power lines over the image or conversely overlay the image over a map of the power lines. In this step, the areas of vegetation that are overlapping or within a buffer distance of the power lines can be separated from areas outside of the buffer distance. At block 306, the area of vegetation overlapping or within the buffer distance of the power lines can be passed through a filter and processed using edge detection or segmentation techniques. The step enables a system to distinguish individual trees. The trees can be marked with polygons that follow the contour of the tree crown. The tree canopy diameter can be determined by measuring an end-to-end distance of the polygon.

By analyzing the spectral characteristics, the tree species and fitness can be determined. The height of each tree can be predicted using the tree species and tree crown size as described above. The tree height prediction can also take into consideration the surrounding vegetation, soil quality, environment, weather patterns, wind patterns, wind forces, and climate patterns to achieve more accuracy.

At block 308 a risk analysis can be performed on each tree. The risk analysis can take into consideration the proximately to the power line, tree species, soil quality, wind effects, and overall dryness of the environment. Using these and any other appropriate inputs, a risk value can be determined for each tree. After identifying each tree's risk value, a map of the target location can be created. The map can include a visual indication of the power line locations and the potentially hazardous trees. The map can also include visual markers to distinguish between high risk trees and low risk trees. For example, the trees can be colored as along the color spectrum with the highest risk values being marked in red and the lowest risk values being marked in blue. In other embodiments, the risk value differences can be notated by shapes or numbers. The map can also be generated using predictive analytics to show predicted risk values at some future date or dates.

The risk value can be compared to a threshold value. If the risk is below the threshold value, no further action needs to be taken. If, however, the risk value is greater than a threshold value, a work order can be generated 310. The work order can direct a crew to the target location to remove the tree hazard. The work crew can remove the tree hazard by removing the tree or pruning the tree. The work order can also include an expected finish date. Once the expected finish date has passed, a new image or set of images can be retrieved and the analysis can be performed again to determine if the risk value has decreased below the threshold amount.

Additional processes may also be included. It should be understood that the processes depicted in FIG. 3 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other power media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper power cables, optical power fibers, wireless power, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   distinguishing, by a processor, a tree canopy region from a grass region based on pixilation differences of image data of a target location;
   detecting, by a processor, individual trees that are within the tree canopy region and within a buffer distance from a power line based on spectral characteristics of the tree canopy region within the buffer distance;
   calculating, by the processor, a risk value for a first tree of the individual trees based on a risk of contact between the power line and the first tree; and
   issuing, by the processor, a work order to maintain the first tree to prevent contact with the power line based on the risk value,
   wherein calculating the risk value for the first tree comprises:
   calculating, by the processor, a diameter of a tree crown of the a first tree;
   determining, by the processor, a species of the first tree based on the spectral characteristics;
   distinguishing, by the processor, soil from vegetation at the target location based on a blue band of the spectral characteristics,
   determining, by the processor, soil characteristics based on a short-wave infrared band of the spectral characteristics;
   predicting, by the processor, a height of the first tree based on the species, the soil characteristics, and the diameter of the first tree;
   retrieving, by the processor, a height of the power line; and
   determining, by the processor, a likelihood that the tree contacts the power line based on the height of the first tree, the diameter of the tree crown, the soil characteristics, and the height of the power line.

2. The computer-implemented method of claim 1, wherein the spectral characteristics are retrieved from a satellite-based remote imaging sensor.

3. The computer-implemented method of claim 1, wherein detecting the first tree at the target location is based on a ratio of reflected near infrared light and absorbed visible light.

4. The computer-implemented method of claim 1, wherein the computer-implemented method further comprises
   detecting, by the processor, vegetation at the target location based on the spectral characteristics; and
   segmenting, by the processor, the vegetation using edge detection techniques to respectively identify the individual trees.

5. The computer-implemented method of claim 1, wherein the risk value is further calculated based on tree fitness, soil quality, and wind conditions.

6. The computer-implemented method of claim 5, further comprising verifying, by the processor, that the work order has been completed by determining that the risk value of the first tree is below a threshold amount.

7. A system comprising:
a processor communicatively coupled to a memory, the processor configured to:
distinguish a tree canopy region from a grass region based on pixilation differences of image data from a target location;
detect individual trees that are within the tree canopy region and within a buffer distance from a power line based on spectral characteristics of the tree canopy region within the buffer distance;
calculate a risk value for the a first tree of the individual trees based on a risk of contact between the power line and the first tree; and
issue a work order to maintain the first tree to prevent contact with the power line based on the risk value,
wherein calculating the risk value for the first tree comprises:
calculating a diameter of a tree crown of the first tree;
determining a species of the first tree based on the spectral characteristics;
distinguishing soil from vegetation at the target location based on a blue band of the spectral characteristics,
determining soil characteristics based on a short-wave infrared band of the spectral characteristics;
predicting a height of the first tree based on the species, the soil characteristics, and the diameter of the first tree;
retrieving a height of the power line; and
determining a likelihood that the tree contacts the power line based on the height of the first tree, the diameter of the tree crown, the soil characteristics, and the height of the power line.

8. The system of claim 7, wherein the spectral characteristics are retrieved from a satellite-based remote imaging sensor.

9. The system of claim 7, wherein detecting the first tree at the target location is based on a ratio of reflected near infrared light and absorbed visible light.

10. The system of claim 7, wherein the processor is further configured to:
detect vegetation at the target location based on the spectral characteristics; and
segment the vegetation using edge detection techniques to respectively identify the individual trees.

11. The system of claim 7, wherein the risk value is further calculated based on tree fitness, soil quality, and wind conditions.

12. The system of claim 11, wherein the processor is further configured to verify that the work order has been completed by determining that the risk value of the first tree is below a threshold amount.

13. A computer program product, the computer product comprising a non-transitory computer readable storage medium having program instructions embodied therewith, the instructions executable by a processor to cause the processor to:
distinguish a tree canopy region from a grass region based on pixilation differences of image data from a target location;
detect individual trees that are within the tree canopy region and within a buffer distance from a power line based on spectral characteristics of the tree canopy region within the buffer distance;
calculate a risk value for the first tree based on a risk of contact between the power line and the first tree; and
issue a work order to maintain a first tree to prevent contact with the power line based on the risk value
wherein calculating the risk value for the first tree comprises:
calculating a diameter of a tree crown of the a first tree;
determining a species of the first tree based on the spectral characteristics;
distinguishing soil from vegetation at the target location based on a blue band of the spectral characteristics,
determining soil characteristics based on a short-wave infrared band of the spectral characteristics;
predicting a height of the first tree based on the species, the soil characteristics, and the diameter of the first tree;
retrieving a height of the power line; and
determining a likelihood that the tree contacts the power line based on the height of the first tree, the diameter of the tree crown, the soil characteristics, and the height of the power line.

14. The computer program product of claim 13, wherein the spectral characteristics are retrieved from a satellite-based remote imaging sensor.

15. The computer program product of claim 13, wherein detecting the first tree at the target location is based on a ratio of reflected near infrared light and absorbed visible light.

16. The computer program product of claim 13, wherein the processor is further configured to:
detect vegetation at the target location based on the spectral characteristics; and
segment the vegetation using edge detection techniques to respectively identify the individual trees, wherein the plurality of trees includes the first tree.

17. The computer program product of claim 13, wherein the risk value is further calculated based on tree fitness, soil quality, and wind conditions.

* * * * *